Aug. 9, 1927.

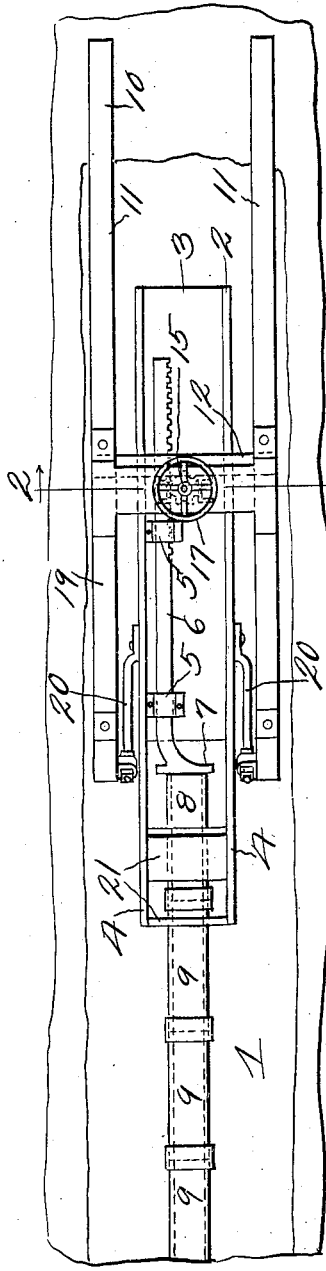

N. KNUDSEN

TILE PIPE HOLDER

Filed April 27, 1926     2 Sheets-Sheet 2

1,638,343

Inventor
N Knudsen
By Philip A. H. Jerrell
Attorney

Patented Aug. 9, 1927.

1,638,343

UNITED STATES PATENT OFFICE.

NIELS KNUDSEN, OF OGDEN, UTAH.

TILE-PIPE HOLDER.

Application filed April 27, 1926. Serial No. 104,949.

The invention relates to tile pipe holders, and has for its object to provide a machine of this character adapted to be disposed in a drainage ditch and to be advanced in the ditch and provided with means, preferably manually controlled and cooperating with the end of the adjacent pipe sections for securely holding the same as the machine is advanced to a position where another pipe section can be placed in axial abutting engagement with the pipe section last laid.

A further object is to provide a pipe holding machine comprising a casing adapted to be disposed in a ditch or trench, and which casing is provided with a horizontally disposed bottom having vertically disposed side walls adapted to protect the device from dirt from the side walls of the ditch, a longitudinally disposed rack bar slidably mounted in bearings carried by the bottom of the member and provided with a transversely disposed member adapted to engage the adjacent end of the last laid pipe section. Also to provide a frame above the device and which frame is provided with a downwardly extending operating shaft the lower end of which terminates in a pinion meshing with the rack bar, and the upper end is provided with a handle member, and by means of which operating shaft the rack bar and its pipe engaging member may be held in close engagement with the pipe end as the device is advanced.

A further object is to provide the rear end of the device with upwardly extending spaced plates which connect the opposite walls of the device together, thereby bracing the same, and at the same time form means for preventing dirt which may be filled in to the device from sliding or falling on the rack bar.

A further object is to provide a horizontally disposed frame above the ditch and which frame is provided with a downwardly extending frame in bearings of which the operating shaft is rotatably mounted. Also to provide bars connecting the frame above the ditch to the side walls of the main frame.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawings:—

Figure 1 is a top plan view of the machine, showing the same disposed in a ditch.

Figure 2 is a vertical transverse sectional view taken on line 2—2 of Figure 1.

Figure 3:
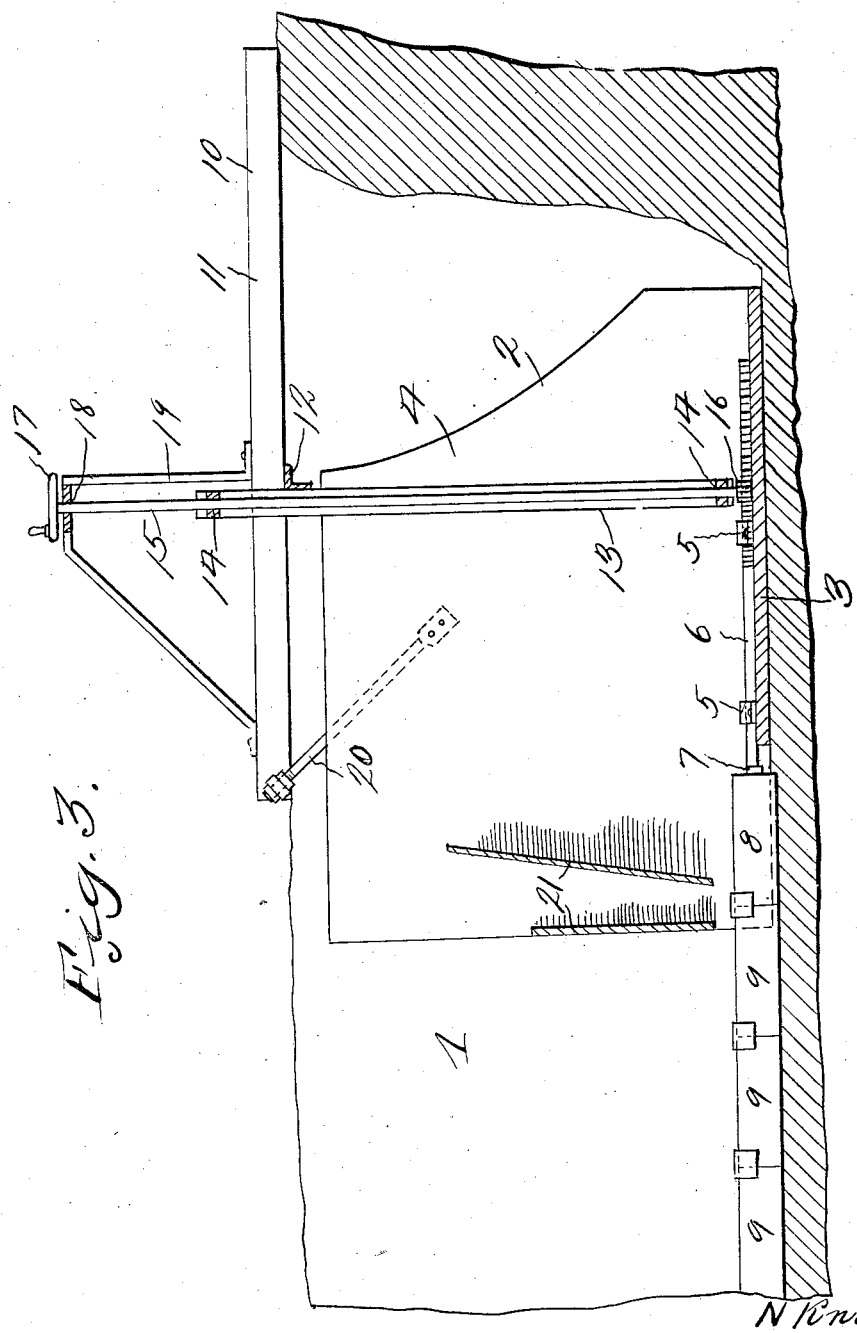
Figure 3 is a vertical longitudinal sectional view through the ditch and the machine.

Referring to the drawings, the numeral 1 designates a conventional form of drainage ditch, however it is to be understood the device may be used in connection with any kind of a ditch, although a drainage ditch will be hereinafter mentioned, applicant does not limit himself thereto. Disposed within the ditch 1 is a casing 2, which casing comprises a horizontally disposed bottom 3, and oppositely disposed side walls 4, which side walls extend to a position adjacent the upper side of the ditch and form means for preventing dirt which may fall from the side walls of the ditch from entering the casing 2. Slidably mounted in bearings 5 carried by the bottom 3 of the casing 2 is a rack bar 6, which rack bar is disposed to one side of the longitudinal center of the bottom 3, the purpose of which will presently appear. Bottom 3 terminates at a point spaced from the rear ends of the side walls 4 as clearly shown in Figures 1 and 3, and the rack bar 6 extends beyond said end of the bottom 3, and is provided with a transversely disposed member 7, which engages the adjacent end of the adjacent pipe section 8, and is adapted to hold said pipe section 8 as well as the other pipe sections 9 in abutting alined engagement as the machine as a whole is moved forwardly to a position where another pipe section can be received, for instance after the ditch or trench has been excavated a sufficient distance.

Disposed above the ditch 1 is a horizontally disposed frame 10, which frame comprises spaced parallel channel bars 11, which channel bars are connected together by means of an angle bar 12, which extends transversely, and to which angle bar is secured a vertically disposed frame 13. Rotatably mounted in bearings 14 of the frame 13 is an operating shaft 15, and which operating shaft has its lower end provided with a pinion 16 which meshes with the rack bar 6, therefore it will be seen the operator can, by grasping the operating wheel 17, force said rack bar 6 rearwardly into close engagement with the pipe section 7 for holding said pipe section 8 as the machine is advanced to a position where the next pipe section may be placed in position, and at the same time the machine as a whole can be forced forwardly by the rack bar 6. The upper end of the operating shaft 15 is rotatably mounted in a bearing 18 of a bracket 19 which is secured to the upper sides of the channel bars 11, and the channel bars 11 are in turn anchored to the side walls 4 of the casing 2 by means of brace bars 20, which brace bars preferably incline downwardly and forwardly and assist in maintaining the casing 2 in its relative position thereto. The rear ends of the side walls 4 of the casing 2 are connected together by upwardly extending walls 21, which brace the same, and under which walls the pipe line extends. Walls 21 also serve to prevent dirt from falling into the casing when the ditch is being filled behind the machine as the machine advances.

The operation of the device is as follows. The ditch is partially dug and digging continued forwardly of the device so that the device may be advanced in the ditch. The spaced members 21 or walls receive dirt and allow the dirt to be discharged on the pipe line as completed. As each section of the pipe line is placed in position and covered the operator grasps the handle member 17, rotates the shaft 15 and the pinion 16 and forces the rack bar 16 rearwardly with its cross member 7, which has been used to hold the pipe section 8 rearwardly and as the pipe line will prevent the rearward movement of the rack bar 6, it is obvious that the bottom member 5 with its side members 2 will be forced away from the pipe section 8 and advanced in the trench until it is moved a sufficient distance to allow the insertion of the next pipe section, and at which time the bar 6 is moved forwardly to a position whereby it may be again moved rearwardly into engagement with the placed pipe section.

From the above it will be seen a pipe holding machine is provided which is simple in construction, manually operated, and one which will positively hold the end of a pipe line formed sections as the machine is advanced to a position where an additional pipe section may be placed in position. The device is particularly adapted for use in connection with the laying of tile pipe in drainage ditches.

The invention having been set forth what is claimed as new and useful is:—

1. The combination with a pipe holding machine comprising a casing disposed in a ditch and adapted to be advanced intermittently in the ditch, of means carried by said machine and cooperating with the adjacent end of a pipe line for holding said pipe line in position and forcing the machine forwardly, said means comprising a rack bar longitudinally disposed in the bottom of the casing, a transversely disposed member carried by one end of the rack bar and adapted to engage the pipe line end, a vertically disposed operating shaft extending upwardly through the casing and terminating above the casing, a gear carried by said operating shaft and meshing with the rack, a handle member carried by said operating shaft, a horizontally disposed frame above the casing and connected thereto, an upwardly extending bracket carried by said frame and in which the upper end of the operating shaft is rotatably mounted and a handle member carried by the upper end of the operating shaft.

2. A pipe holding machine comprising a casing U-shaped in vertical transverse cross section and disposed within a ditch, a rack bar horizontally disposed and slidably mounted in the bottom of said casing, a pipe engaging member carried by one end of the rack bar, a horizontally disposed frame above the casing and connected thereto, an operating shaft extending downwardly into the casing and a pinion carried by the operating shaft and meshing with the rack bar.

3. A pipe holding machine comprising a casing having its upper side open, a rack bar slidably mounted in bearings carried by the lower end of the casing and adapted to engage an adjacent pipe end, a horizontally disposed frame above the casing, a downwardly extending frame carried by the horizontally disposed frame and extending into the casing to a position adjacent the lower end thereof and the rack bar, a vertically disposed operating shaft rotatably mounted in bearings of the downwardly extending frame and the horizontally disposed frame, a pinion carried by the operating shaft and meshing with the rack bar and a handle member carried by the operating shaft.

In testimony whereof I hereunto affix my signature.

NIELS KNUDSEN.